United States Patent [19]

Caesar

[11] Patent Number: 4,692,423

[45] Date of Patent: Sep. 8, 1987

[54] METHOD FOR PREPARING STRUCTURED CATALYTIC SOLIDS

[75] Inventor: Philip D. Caesar, St. John, British Virgin Isls.

[73] Assignee: Mobil Oil Corporation, New York, N.Y.

[21] Appl. No.: 804,552

[22] Filed: Dec. 4, 1985

[51] Int. Cl.$^4$ .......................... B01J 29/06; B01J 27/20
[52] U.S. Cl. ........................................ 502/62; 502/64; 502/66; 502/71
[58] Field of Search .............................. 502/62, 64, 71

[56] References Cited

U.S. PATENT DOCUMENTS

| | | | |
|---|---|---|---|
| 3,244,643 | 4/1966 | Schwartz | 502/64 |
| 3,468,815 | 9/1969 | Cole et al. | 502/64 |
| 3,813,347 | 5/1974 | Hayes | 502/62 |
| 4,303,782 | 12/1981 | McHale et al. | 528/416 |

*Primary Examiner*—Carl F. Dees
*Attorney, Agent, or Firm*—A. J. McKillop; M. G. Gilman; L. P. Hobbes

[57] ABSTRACT

A method for manufacturing structured catalysts in which a zeolite is uniformly dispersed on at least one surface of a porous support. The porous support may be organic or inorganic, and in the form of a particle, a sheet, a rod, a tube, or a shape object. The article is prepared by coating the porous support with a sol formed by suspending the zeolite in a polymerizable solvent such as tetrahydrofuran.

28 Claims, No Drawings

METHOD FOR PREPARING STRUCTURED CATALYTIC SOLIDS

This invention is concerned with a catalyst, and in particular with a catalytic solid structure characterized by the presence of a uniform superficial layer of a crystalline aluminosilicate zeolite such as ZSM-5. The catalyst may have the shape of a tube, rod, sheet or shaped article, such as, for example, a monolith that can be used in an automotive exhaust converter; or, it may be in the form of regular or irregular particles such as are commonly used in fixed bed or fluid bed catalytic conversions.

The invention is further concerned with a method for preparing the aforesaid catalyst. In this method, a porous support is coated with a dispersion of said crystalline aluminosilicate zeolite, as more fully described below.

The invention is further concerned with a method for separating certain crystalline aluminosilicate zeolites from other particulate solids including other zeolites, as more fully described hereinbelow.

The invention is further concerned with an improved process for isomerizing xylenes.

Zeolite catalyst components are formed initially as very fine powders, and usually are composited with binders to form larger particles which are then utilized in a packed bed or a fluidized bed, for example. Whereas the engineering technology of such beds has advanced to the point where it is usually possible to design a system that will be effective for a particular reaction, in some instances more efficient systems could be designed were the catalyst available in the form of rods, tubes or other shapes. It has been proposed, for example, to provide a single shaped ceramic body with catalytic surface for use as the active element in an automotive exhaust muffler.

The art of heterogeneous catalysis has advanced to the stage where it is recognized that diffusion of reactant and products can play a significant and sometimes dominant role in not only the rate of conversion but in the selectivity for a particular product. The latter aspect is of particular significance when more than one product is formed in a reaction. Thus, it would be desirable to provide a method for favorably altering the diffusion effects of a catalyst and catalysts having improved diffusion behavior.

The present invention utilizes the discovery, disclosed in U.S. Pat. No. 4,303,782, incorporated herein by reference that an unusual phenomenon occurs when polymerization of an organic polymerizable cyclic oxide solvent, tetrahydrofuran (THF), is catalyzed by a zeolite. The polymer chains appear to initially start at or within a zeolite and remain attached to it, with subsequent growth outwardly from the crystal by the reaction, in the case of THF:

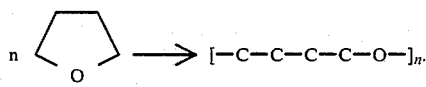

Regardless of whether or not growth occurs by a so-called insertion mechanism, the formation of polymer forces the minute crystallites apart. Since the polymer is highly solvated by the remaining monomer solvent, a highly dispersed sol of polymer-crystallite complex in solvent is formed. The formation of this sol is usually evidenced by increased viscosity. That the polymer and crystallite are intimately associated is evidenced by degradation and masking of the usual X-ray diffraction pattern. The normal X-ray pattern is recovered on removal of the polymer. To summarize, it appears that the minute zeolite crystals, which normally form aggregate due to electrostatic or other effects, are deflocculated as a consequence of the polymerization reaction, and of the intimate association of polymer and catalyst. This phenomenon is termed herein "reactive deflocculation." The fluid sol which forms contains "reactively deflocculated zeolite."

The polymerisation occurs with various cations on the zeolite. However, it has been found that the rate of polymerisation is favored by enhanced acidity in the zeolite such as that obtained by lowering alkali metal content in the zeolite. Preferably, the alkali metal content is below 1.0 weight percent and advantageously below 0.5 or even 0.1 or 0.05 weight percent. It has been found that polymerisation takes place on some zeolites which have, in fact, been sodium exchanged but in most cases the yield is poor. It has been found, however, that certain zeolites such as ZSM-5 can function as polymerization catalysts without scrupulous removal of alkali metal from the catalyst. The desirability of maintaining a low sodium content persists at different silica:alumina ratios in the zeolite, as shown in Table 1 below. All the zeolites indicated in Table 1 polymerised tetrahydofuran readily at room temperature.

TABLE 1

| Zeolite | $SiO_2:Al_2O_3$ (Ratio by Wt.) | $Na_2O$ (Percent by Wt.) |
|---|---|---|
| ZSM-5 | 68 | 1.2 |
| ZSM-5 | 77.3 | 1.0 |
| ZSM-5 | 298 | 1.5 |
| ZSM-5 | 1670 | 1.6 |
| HY | 4 | 0.4 |

Zeolites such as H-Zeolon and H-Y were found to act as polymerization catalysts when alkali metal was scrupulously removed through ammonium ion exchange and calcination followed by additional ammonium ion exchange and calcination.

The foregoing explanation is offered to provide a basis for understanding the present invention. While not wishing to be bound by theory, it is clear that the interaction of an organic polymerizable cyclic oxide solvent such as tetrahydrofuran catalyzed by a zeolite such as HZSM-5 results in effectively "solubilizing" the zeolite without destroying its structure. This is further shown by Example 1.

Further information relating to zeolites may be found in U.S. Pat. No. 4,303,782, including metallosilicates such as ZSM-5 which exhibit a constraint index of 1 to 12 and a silica/alumina molar ratio greater than about 12.

EXAMPLE 1

5 grams of ZSM-5 having a crystallite size of about 0.02 micron were mixed with 5 grams of quartz fines. The mixture was placed in a Waring blender until powder formed. One ml of this powder was mixed with 9 ml of 700–1500 μ quartz fines in a column and tetrahydrofuran was passed down the column. The effluent was found to contain a substantial percentage of the ZSM-5. A similar column treated with toluene instead of tetrahydrofuran removed no ZSM-5.

The sols prepared as more fully described hereinbelow are used to coat porous solids. Elimination of the organic component of the sol by heating in the presence or absence of oxygen deposits a uniform layer of crystalline zeolite on the surface of the solid.

Preparation of the deflocculated zeolite sol is dependent on the polymerization of the polymerizable monomer. The polymerizable monomers that are useful for the purpose of this invention may include any polymerized organic solvent in which the polymerization is catalyzed by the zeolite catalyst more fully described hereinbelow, and which exhibits the essential characteristics of intimate interaction of the polymer and catalyst with the formation of a reactively deflocculated zeolite sol. In particular, this invention is operable utilizing a polymerizable cyclic oxide solvent. Whether or not a particular cyclic oxide solvent is polymerizable is readily determined by a simple bench top test, in which a mixture of dry, purified solvent is mixed with a dry zeolite catalyst, and allowed to stand in a sealed container for about 24 hours, at which time polymerization will become evident from a thickening of the suspension. The group consisting of tetrahydrofuran, 1,2-epoxycyclohexane and 1,2 epoxypropane is readily polymerized, and constitutes a preferred group for purposes of this invention. Tetrahydrofuran is particularly preferred as the polymerizable cyclic oxide solvent. The formation of the reactively deflocculated zeolite is illustrated in Example 2 in which tetrahydrofuran is used as the cyclic oxide solvent and HZSM-5 powder having a particle size of about 0.02 micron was used as the catalyst. The ZSM-5 catalyst had a silica/alumina ratio of about 70/1.

EXAMPLE 2

The tetrahydrofuran was purified by distillation from sodium borohydride under an atmosphere of nitrogen. The distilled product was kept refrigerated under nitrogen in sealed bottles. The ZSM-5 was calcined in air at 500° C. before use.

A mixture of the foregoing tetrahydrofuran and one weight percent of ZSM-5 catalyst was stirred at room temperature for two days, after which the mixture was coagulated with water and dried. The dried coagulum contained 13 parts by weight of tetrahydrofuran polymer and one part by weight of ZSM-5. The X-ray structure of the ZSM-5 was almost completely masked. A portion of the coagulum was heated for 72 hours at 200° C. under vacuum which removed all polymer. The X-ray structure of the recovered ZSM-5 was completely restored. A second portion of the coagulum was calcined for 3 hours at 500° C. in oxygen and in this case, too, the X-ray structure of the recovered ZSM-5 was completely restored.

While the foregoing example illustrates the polymerization and formation of reactively deflocculated zeolite using very dry pure cyclic organic solvent, the degree of purity required in ordinary usage need not be extreme. For example, while it is preferred to use substantially dry cyclic organic solvent and zeolite, the presence of some moisture is tolerable, its only effect apparently being to retard the polymerization.

For tetrahydrofuran, the polymerization with the formation of the desired sol occurs over a very wide range of temperature, from below room temperature to 68° C., the boiling point of tetrahydrofuran.

The amount of cyclic oxide solvent used to form the sol may vary widely, depending on the solvent and zeolite catalyst used and the viscosity desired in the final sol. In terms of the amount of zeolite required in this invention, as little as 0.01 wt % crystalline zeolite is effective to induce measurable formation of polymer. Useful concentrations of zeolite range from about 0.1 wt % to 100 wt % of the solvent, and preferably from about 2.0 wt % to 50 wt % of the solvent. The higher concentrations, in general, form more viscous solutions. The time required after admixture or contacting of the zeolite and solvent can vary from about 0.1 hour to 100 hours, and the temperature used may be about 0° C. to 150° C., with the preferred range being about 25° C. to about 100° C. or up to the boiling point of the solvent if this is below 100° C.

It is noted that not all cyclic oxide solvents are useful in the present invention because not all are polymerizable. For example, whereas tetrahydrofuran is useful, an admixture of ZSM-5 and tetrahydropyran in amounts of 0.5 grams and 10 grams, respectively, formed no polymer in 7 days at room temperature, indicating that tetrahydropyran is not polymerizable, at least at room temperature. This solvent might be useful, however, at elevated temperature. Reasonable use of the simple test hereinabove described will determine whether or not a particular cyclic oxide solvent is polymerizable and useful for the purposes of this invention. Cyclic oxides which react but do not form polymer, such as styrene oxide, are not within the scope of polymerizable cyclic oxide solvents and are therefore excluded. The conversion of styrene oxide does not result in the formation of a sol comprising reactively deflocculated crystalline aluminosilicate zeolite.

Whereas the foregoing description has been in terms of directly preparing a sol by admixture of zeolite with polymerizable cyclic oxide solvent, it will be recognized by those skilled in the art that variants of this procedure are available. Contemplated as within the scope of this invention, for example, is the preparation of a substantially dry powder comprising a zeolite-polymer complex formed by exposing a substantially dry zeolite powder to the vapors of a polymerizable cyclic oxide solvent under conditions of time and temperature to induce polymer formation. The zeolite-polymer complex thus formed may then be dispersed in liquid solvent effective to form a sol comprising reactively deflocculated zeolite. This latter solvent may be any effective solvent including said polymerizable cyclic oxide solvent.

The present invention can be described as a method for manufacturing a structured catalytic solid comprising a zeolite and a porous support, said zeolite being uniformly distributed on a surface of said porous support. The method comprises admixing the zeolite with an organic polymerizable cyclic oxide solvent under polymerizing conditions to form a fluid sol comprising a polymerized organic component and reactively deflocculated zeolite. The sol is contacted with a surface of the porous support thereby coating the surface and substantially removing the residual solvent and said polymerized organic component are thereafter substantially removed from the coated surface.

A wide variety of porous solids may be used as the support for the structured catalytic solid of this invention. The material of the support may be selected from the group consisting of porous inorganic oxides, porous carbons and porous organic polymers. The support may be a rigid solid, as in the case of the inorganic oxides and carbons. Or, in the case of porous organic polymers, the support may be rigid or flexible to varying degrees. In all cases, it is preferred that the support be resistant to substantial physical change at a temperature of at least about 150° C., preferably 500° C., in order to allow removal of the cyclic oxide polymer is desired. Also, it is preferred, but not essential, that the support have at least 20 percent of its pore volume in pores having a diameter greater than 10 Angstroms. Such structure favorably affects deposition and adhesion of the zeolite.

The porous inorganic oxide supports may be any one of a variety of materials, including porous glass, porous ceramic bodies made from clays, particles made by pelleting clays, aluminas, or other inorganic oxides, or synthetic gel particles of alumina, silica-alumina and silica-magnesia. These bodies, particularly the particulate bodies, may contain catalytic substances such as zeolites dispersed therein, or the bodies themselves may be catalytic by virtue of the composition of the solid, an example of which would be a fluid cracking catalyst of silica-alumina.

For purposes of this invention, the inorganic oxide support may have a particle size ranging from about 20 microns to one inch and may be a rod, sheet, tube, monolith or shaped object. Clay bodies, such as tubes, may be glazed on either the exterior or interior surface, and coated only on the other, porous surface. Electrodes of porous carbon or porous plastic may be formed by coating with the hereinabove described sol.

To prepare the structured catalytic solid of this invention, a sol prepared as described above is contacted with at least one surface of the porous support so as to coat it, and the excess solvent is driven off or otherwise removed to form a uniform superficial layer comprising crystalline zeolite. If desired, the polymer in the superficial layer is removed by heating in an inert atmosphere, calcining at elevated temperature such as in the range of about 400° C. to 800° C., or combinations thereof. The first applied coating may be further treated to deposit additional zeolite; such as a second zeolite of substantially lower activity, or it may be further treated to impart improved adhesion. A calcined structured catalytic solid may, for example, be coated with sodium silicate or ethyl orthosilicate, for example, to improve adhesion. Either of these materials is readily hydrolyzed to form silica-gel type binder, thereby enhancing adhesion.

The structured catalytic solid in all cases is characterized by the presence of a support with a coating of the hereinabove described zeolite present on at least one surface of the support. The crystalline zeolite may constitute from 0.01 wt. % to 10 wt. % of the structured catalytic solid, and may contain a platinum group metal such as platinum, palladium, rhodium, iridium, ruthenium or osmium in a concentration from 0.01 to 10.0 wt. %.

Structured catalytic particles are made by the method of this invention so as to have particularly desirable diffusion properties. For example, a support characterized by little or no catalytic activity may be coated with a highly active zeolite catalyst to form an "egg-shell" catalyst. The inverted relation produces an "egg-yolk" catalyst.

The catalytic solids of the present invention are believed to be useful in processes relating to the shape-selective catalytic conversion of organic compounds including toluene disproportionation, xylene isomerization and methanol to olefin processes which comprise contacting organic compounds with said catalytic solids under conventional organic compound conversion conditions.

This invention will now be illustrated by further examples, without limitation on the scope thereof which is defined by the claims.

EXAMPLE 3

0.1 g Pt-ZSM-5 having a crystal size of about 0.02 to 0.05 microns was reacted with 10 g THF for 5 hours. The very viscous reaction product was diluted with 10 g fresh THF and immediately thereafter, 10 g (20 ml) of γ-alumina were added in the form of 1 mm spheres. The unreacted THF was evaporated off and the resulting sticky pellets were heated for 16 hours at 20020 under vacuum. This removed most of the PTHF as THF by depolymerization. The greyish product was calcined to a bright white product at 500° C. for one hour.

The ZSM-5 starting material had a 70/1, $SiO_2/Al_2O_3$ ratio, and contained 0.33% platinum, added by exchange from chloroplatinic acid. It was calcined at 500° C. before use.

EXAMPLE 4

The catalyst of Example 3 which contained a maximum of 1% Pt-ZSM-5 of 0.02 to 0.05 microns, was tested in a high temperature xylene isomerization process under the conditions disclosed in U.S. Pat. No. 4,312,790, incorporated herein by reference.

What is claimed is:

1. A method for manufacturing a structured catalytic solid comprising a zeolite and a porous support, said zeolite being uniformly distributed on a surface of said porous support, which comprises admixing said zeolite with an organic polymerizable cyclic oxide solvent under polymerizing conditions thereby forming a fluid sol comprising a polymerized organic component and reactively deflocculated zeolite, contacting said sol with said surface of said porous support thereby coating said surface, and substantially removing residual solvent and said polymerized organic component from the coated surface, provided that where said porous support is an inorganic oxide, the particle size of said support ranges from about 20 μ to 1 inch.

2. The method of claim 1 wherein said zeolite is hydrogen ion-exchanged.

3. The method of claim 1 wherein said zeolite has an alkali metal content below 0.5 weight percent.

4. The method of claim 2 wherein said zeolite has an alkali metal content below 0.1 weight percent.

5. The method of claim 2 wherein said zeolite has an alkali metal content below 0.05 weight percent.

6. The method described in claim 1 wherein said porous support comprises inorganic oxides.

7. The method of claim 1 wherein said porous support comprises a zeolite dispersed in a matrix.

8. The method described in claim 1 wherein said porous support comprises carbon.

9. The method described in claim 6 wherein said residual solvent and polymerized organic component are substantially removed by calcining said structured catalytic solid.

10. The method described in claim 1 wherein said organic polymerizable cyclic oxide solvent is selected from the group consisting of tetrahydrofuran, 1,2-epoxycyclohexane and 1,2-epoxypropane.

11. The method described in claim 1 wherein said organic polymerizable cyclic oxide solvent is tetrahydrofuran.

12. The method described in claim 1 wherein said zeolite is hydrogen-exchanged and has a constraint index of about 1 to 12 and a silica to alumina molar ratio greater than about 12.

13. The method described in claim 1 wherein said zeolite is hydrogen exchanged Zeolite Y.

14. The method described in claim 1 wherein said zeolite contains 0.01 to 10 wt. % of a platinum-group metal.

15. The method described in claim 9 wherein said zeolite contains 0.01 to 10 wt. % of a platinum-group metal.

16. The method described in claim 10 wherein said zeolite contains 0.01 to 10 wt. % of a platinum-group metal.

17. The method described in claim 12 wherein said zeolite contains 0.01 to 10 wt. % of a platinum-group metal.

18. The method described in claim 7 wherein said reactively deflocculated zeolite contains 0.01 to 10 wt. % of a platinum-group metal.

19. The method described in claim 1 wherein a structured catalytic solid comprising particles of a zeolite said porous support has at least 20 percent of its pore volume in pores having a diameter greater than 100 Angstroms.

20. The method described in claim 19 wherein said solid is a rod, sheet, tube, monolith, or particle having a particle size of about 20 microns to one inch.

21. The method described in claim 19 wherein said support is a rigid solid.

22. The method described in claim 19 wherein said support is selected from the group consisting of porous inorganic oxides, porous carbons, and porous organic polymers.

23. The method described in claim 22 wherein said support is an acidic porous inorganic oxide.

24. The method described in claim 19 wherein said crystalline aluminosilicate zeolite contains a platinum-group metal.

25. The method described in claim 19 wherein said zeolite contains a platinum-group metal.

26. The method described in claim 19 wherein said zeolite is ZSM-5.

27. The method described in claim 19 wherein the porous support is a catalytic particle comprising a zeolite dispersed in a matrix.

28. The structured catalytic solid prepared by the method of claim 1.

* * * * *

UNITED STATES PATENT AND TRADEMARK OFFICE
CERTIFICATE OF CORRECTION

PATENT NO. : 4,692,423

DATED : September 8, 1987

INVENTOR(S) : Philip D. Caesar

It is certified that error appears in the above-identified patent and that said Letters Patent is hereby corrected as shown below: Title Page:

Abstract, line 5    "shape" should be --shaped--

Column 6, line 14    "20020" should be --220°--

Cover Page, Inventor's Residence    "St. John, British Virgin Isls." should be --St. John, U.S. Virgin Islands--

Signed and Sealed this

Eighth Day of March, 1988

Attest:

DONALD J. QUIGG

*Attesting Officer*     *Commissioner of Patents and Trademarks*